Nov. 10, 1964    D. W. DENNY    3,156,123
SEQUENCE CONTROLLER MECHANISM
Filed Jan. 18, 1961    4 Sheets-Sheet 1

Inventor:
Dann W. Denny,
by Thomas A. Briody
Attorney.

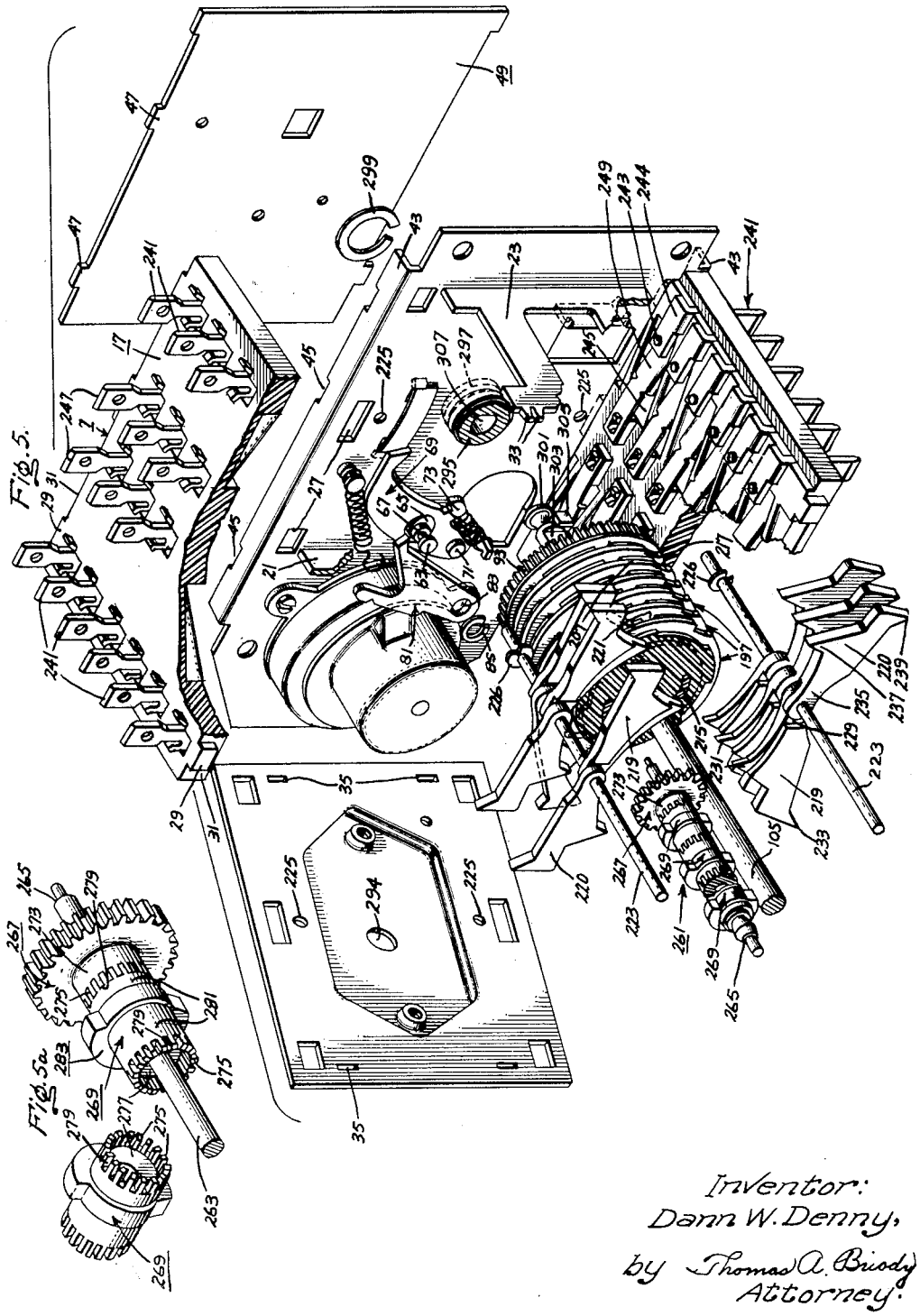

Nov. 10, 1964 D. W. DENNY 3,156,123
SEQUENCE CONTROLLER MECHANISM
Filed Jan. 18, 1961 4 Sheets-Sheet 4
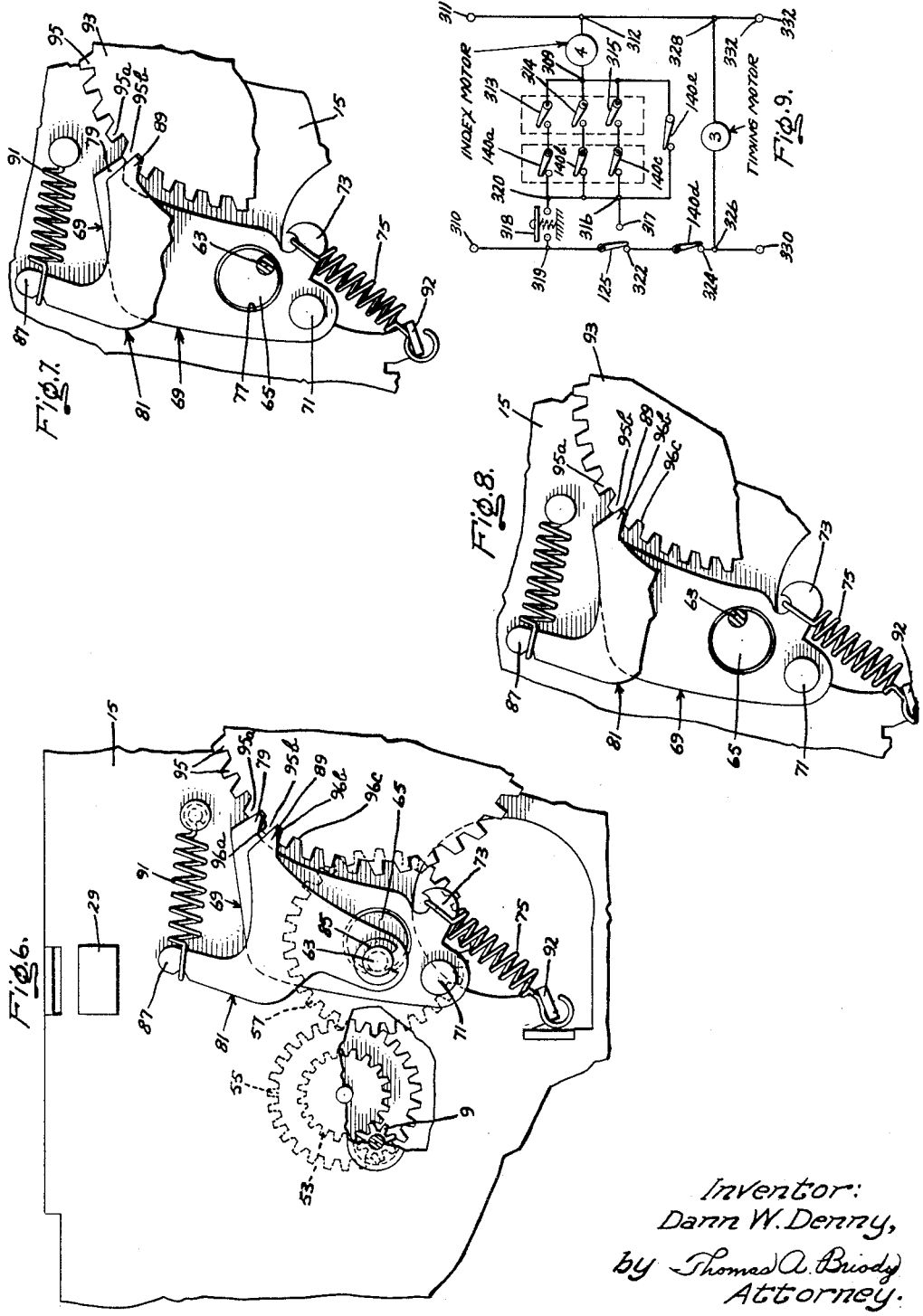

United States Patent Office 3,156,123
Patented Nov. 10, 1964

3,156,123
SEQUENCE CONTROLLER MECHANISM
Dann W. Denny, Morrison, Ill., assignor to General
Electric Company, a corporation of New York
Filed Jan. 18, 1961, Ser. No. 83,462
14 Claims. (Cl. 74—54)

The present invention relates to sequence controllers and more particularly, to a mechanism for operating a plurality of electric switches in accordance with a predetermined sequence or pattern.

An object of my invention is to provide an improved mechanism for operating a plurality of control devices in accordance with a predetermined sequence.

Another object of this invention is to provide a novel and improved mechanism for operating a plurality of switches or similar control devices in a selectively variable predetermined sequence.

Another object of this invention is to provide an improved sequence controller mechanism for electric switches, which mechanism includes a simplified and efficient means for rapidly driving the switch operating members to a desired starting position for each cycle of operation.

An additional object of this invention is to provide a sequence controller for operating a multiplicity of electric switches, wherein an improved means is provided for alternately driving switch operating members by two motors of differing output speeds.

A further object of my invention is to provide a sequence controller for operating a multitude of electric switches, wherein an auxiliary rotatable switch actuating unit is utilized to enhance the flexibility of operation of the controller.

It is a still further object of my invention to provide an improved sequence controller mechanism for a multitude of electric switches, wherein a plurality of auxiliary cam members are fastened together in a novel manner to enhance the flexibility and simplicity of manufacture thereof.

Another object of my invention is to provide an improved sequence controller for a multitude of electric switches, which controller may be manufactured at a reduced cost due to its relative simplicity, and is very efficient in operation.

In carrying out the present invention, in one aspect thereof, I provide a control mechanism for operating a plurality of electric switches. This mechanism includes a main rotatable switch actuating unit and a plurality of switches distributed about the axis of the main actuating unit and operated thereby in sequence to complete a predetermined cycle of operation. A motor driven means is provided for rotating the main switch operating unit. With this arrangement, a special auxiliary gear is disposed in the controller in driving relation with one of the gears of the motor driven means. A plurality of auxiliary cam members are angularly positioned and coaxially stacked upon this auxiliary gear. The auxiliary cams and the auxiliary gear include complementary interdigitating teeth of castle-like configuration for securing the auxiliary cams and gear together. The auxiliary cams are axially positioned alongside of the actuating means of associated switches to provide an additional simplified and flexible controlling means for the sequence controlling mechanism.

By a further aspect of my invention, I provide an improved arrangement for alternatively driving switch operating members of the sequence controlling mechanism by two motors of different output speeds. This improved arrangement may, of course, be combined with the aforesaid structure to provide a particularly desirable sequence controller mechanism. In this arrangement, an indexing motor of relatively high output speed is utilized for intermittently rotating the switch operating members rapidly in successive steps. A timing motor is also utilized for intermittently rotating the switch operating unit in successive steps during the timed portion of the controlled cycle. To allow the two motors of differing output speeds to alternatively drive the switch operating members, an intermediate gear is continuously driven by the timing motor and rotatably journalled in an elongated supporting slot. This slot is positioned relative to the intermediate gear and the timing motor pinion so that the intermediate gear is driven toward one end of the slot by the timing motor when the indexing motor is de-energized, and the timing motor then drives the switch operating members. When the indexing motor is energized, the intermediate gear is movable toward the other end of the slot to disengage it from its driving relation with the switch operating members. This allows the switch operating members to be driven by the indexing motor. By positioning the intermediate gear in the elongated supporting slot, a simplified and efficient means is thereby provided for allowing the two motors of differing output speeds to selectively drive the switch operating members.

Further aspects of my invention will become apparent hereinafter, and the specification concludes with claims particularly pointing out and distinctly claiming the subject matter which is regarded as my invention. The invention, however, as to organization and method of operation, together with further objects and advantages thereof, may best be understood with reference to the following description, when taken in conjunction with the accompanying drawings in which:

FIG. 5 is a fragmentary, perspective, exploded view showing various parts of the controller with the end walls partially broken away;

FIG. 5a is an enlarged fragmentary, perspective, and partially exploded view to show the auxiliary cam gear and auxiliary cams for the sequence controller;

FIGS. 6, 7 and 8 are fragmentary views to illustrate various sequential positions assumed by the intermittent driving mechanism for the controller, with portions of the crank gear assembly not being shown for purposes of simplification; and FIG. 9 is a circuit diagram to illustrate one manner of electrically regulating my improved sequence controller.

Figure 1:
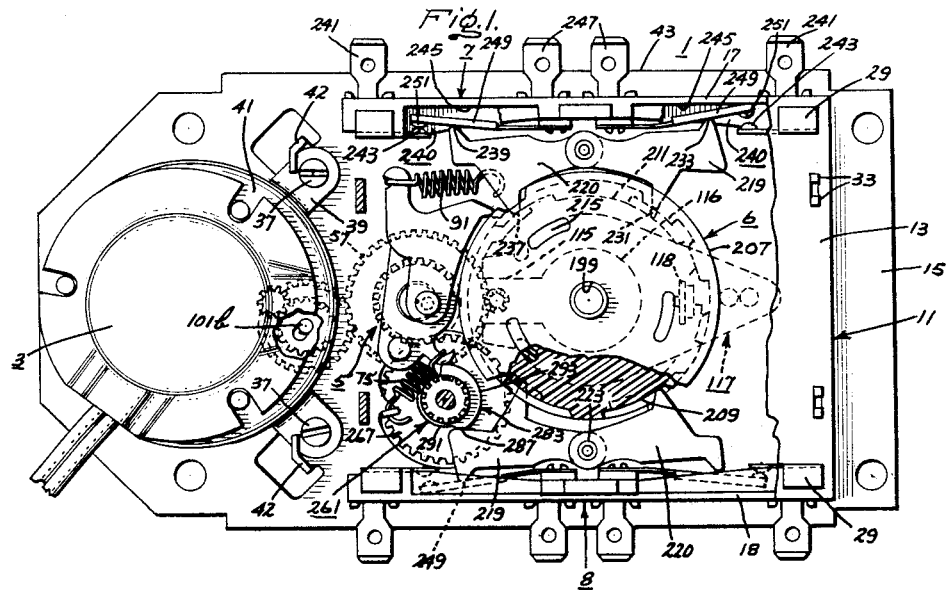
FIG. 1 is a front view of my improved sequence controller with the front plate, main switch operating unit, and other structure partially broken to illustrate the interior of the controller mechanism.
Figure 2:
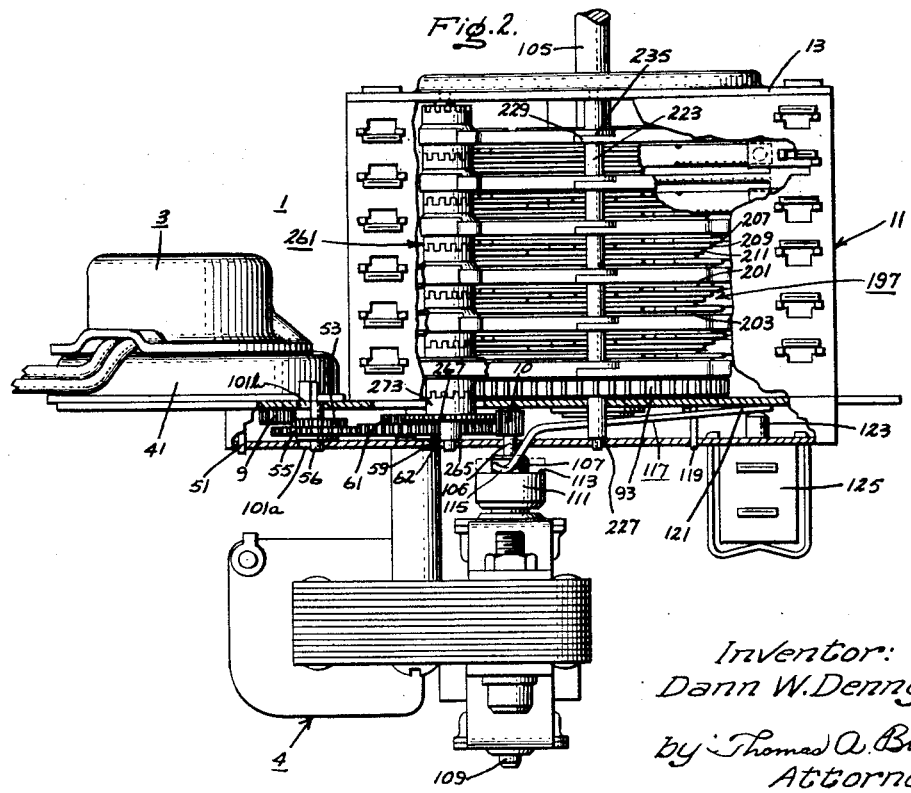
FIG. 2 is a bottom view partially broken away and partially in section to show part of the driving means for the sequence controller and other interior structure thereof.

Referring in detail to the drawings, and in particular at first to FIGS. 1 and 2, there is shown a sequence controller 1 having a suitable timing motor 3, an indexing motor 4, an intermittent drive mechanism 5, a main rotatable switch operating unit 6, and switching devices 7 and 8. Timing motor 3, as illustrated in FIG. 2, is of the self-starting synchronous type, and it provides rotary motion from output pinion 9 at the desired number of revolutions per minute for drive mechanism 5 to intermittently rotate switch operating unit 6 during a timed cycle to sequentially actuate switching devices 7 and 8. Indexing motor 4 is a high torque motor which has an output speed considerably greater than that of timing motor 3, and it provides rotary motion from output pinion 10 to rapidly advance the main switch operating unit 6 to its starting position or various predetermined positions within a master cycle of operation.

To simply, efficiently and compactly support and contain the various elements of sequence controller 1 in a relatively small housing, as shown in FIGS. 1, 2, and 5, the controller includes a rectangular switch casing 11 formed by front and back plates 13 and 15 respectively, terminal boards 17 and 18, and spacer plates 21 and 23 (shown fragmentarily in FIG. 5). More particularly, the front and back plates 13 and 15 have rectangular slots 25 and 27 respectively, formed near their elongated outer sides. The slots 25 and 27 receive and cooperate with mating rectangular bosses 29 projecting edgewise from opposite elongated sides 31 of the terminal boards 17 and 18 (as shown in FIG. 1). It will thus be seen that terminal boards 17 and 18 serve structurally as elongated sides for casing 11 and space front and back plates 13 and 15 apart in parallel fashion.

To rigidly secure front and back plates 13 and 15 in cooperative engagement with terminal boards 17 and 18 (i.e., with slots 25 and 27 mating with bosses 29), spacer plates 21 and 23 each include two oppositely disposed pairs of spaced apart fingers 33, such as the pair of fingers shown on plate 23 in FIG. 5. Fingers 33 of the spacer plates are received within narrow slots 35 formed adjacent the shorter ends of the front and back plates 13 and 15 and are turned over on the outer faces of the front and back plates to secure the parts of the casing together.

Figure 3:
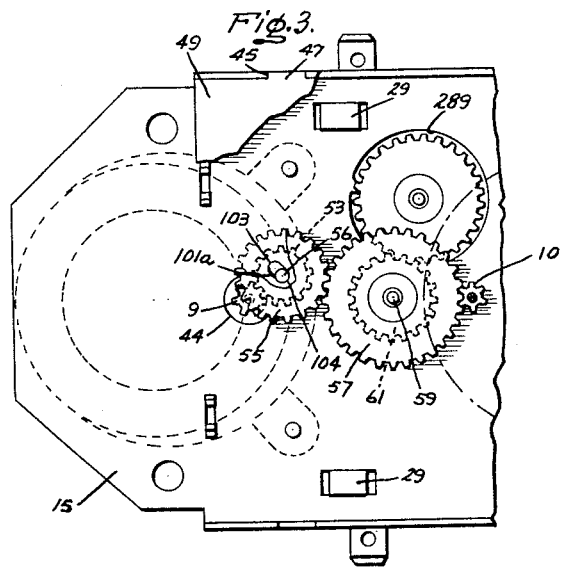
FIG. 3 is a fragmentary back view of the controller with the base or support plate partially broken away to show the driving gear train, and the indexing motor removed from its pinion.

Timing motor 3 is attached to the front side of back plate 15, as shown in FIG. 1, by means of screws 37 which extend through apertures of ears 39 of the housing 41 of the motor. Screws 37 thread into engagement with apertures (not shown) of the back plate 15 to securely attach the timing motor 3 thereto. Tabs 42 are also bent over from back plate 15 to engage ears 39 as shown in FIG. 1, and provide additional securement for the motor 3. Pinion 9 of motor 3 extends rearwardly, as shown in FIGS. 2 and 3 through circular aperture 44 of back plate 15. Flanged sides 43 are turned perpendicularly rearwardly from the flat principal surface of back plate 15. The outer or rearward edge of each of the sides 43 has a plurality of recesses 45 which cooperate with and are engaged by ears 47 of support plate 49 in the manner illustrated representatively in FIG. 3. Support plate 49 is rigidly held in spaced parallel relationship with back plate 15 by a plurality of spacers 51 (such as the one shown in FIG. 2), which are staked to each of the plates 15 and 49 in the same manner as described for spacer plates 21 and 23. As shown in FIG. 2, back plate 15 and support plate 49 cooperate to provide a shallow box-like cavity for the gear train of the intermittent drive mechanism 5.

As best shown in FIGS. 2 and 3, timing motor pinion 9 is in mesh with gear 53. Gear 55 is attached to the same shaft 56 as gear 53 and is rotatable therewith. The combination of gears 53 and 55 provides a reduction gearing means for reducing the speed of angular rotation provided by motor pinion 9. The means for rotatably mounting these gears forms an important aspect of my invention and shall be described in detail hereinafter. Gear 55 meshes with crank gears 57. As best shown in FIGS. 2 and 3, crank gear 57 is attached to shaft 59. Shaft 59 is journalled at its outer bottom end 62 to support plate 49 (FIG. 2). Auxiliary gear 61 is also attached to shaft 59 and arranged coaxially upon gear 57. The purpose of auxiliary gear 61 shall be described in detail hereinafter. The upper or inner end portion 63 of crank gear shaft 59, as shown in FIG. 6, resembles a crank pin in that it is eccentric to the axis of crank gear 57 and the bottom end 62 of shaft 59 (FIG. 2). The purpose of eccentric inner end portion 63 of crank gear shaft 59 shall now be described.

For an understanding of the purpose and operation of the eccentric inner end portion 63 of crankshaft 59, attention is drawn to FIGS. 3 and 6–8. Between the eccentric inner end portion 63 (FIG. 6) and the bottom end 62 of the shaft (FIG. 2), an enlarged disc portion 65 is formed. Disc portion 65 is coaxial to crank gear 57 and bottom end 62 of the crank gear shaft 59. Annular groove 67 is formed in the eccentric portion 63 of the shaft between disc portion 65 and the adjacent outer extremity thereof (see FIG. 5).

As shown in FIG. 6, locking lever 69 is pivotally mounted on the inner side of back plate 15 by rivet 71. Lever 69 includes hooked ear 73 which is connected to an associated hooked end of tension spring 75, circular aperture 77 which is larger in diameter than disc portion 65 of crank gear shaft 59 and generally surrounds it, and outer tooth-shaped locking end 79. Between the outer extremity of eccentric portion 63 and disc portion 65, pawl 81 is rotatably journalled upon eccentric portion 63. The bottom end of pawl 81, as shown in FIGS. 5 and 6, has an aperture 83 which receives eccentric portion 63 of crankshaft 59. The C-shaped clip 85 fits into annular groove 67 of eccentric portion 63 to retain pawl 81 in its proper axial position upon eccentric portion 63. Pawl 81 also includes notched arm 87 and tooth-shaped driving end 89. Notched arm 87 is hooked into engagement with one end of tension spring 91.

As shown in FIG. 6, locking lever spring 75 has its one end attached to hooked ear 73 of lever 69 and the other end attached to lanced tab 92 of back plate 15. Spring 75 runs in tension to continuously bias locking lever 69 in a clockwise direction about rivet 71 (viewing FIG. 6), and thereby urges locking end 79 of the locking lever toward ratchet wheel 93. Pawl spring 91 has its one end affixed to notched arm 87 of the pawl 81 and the other end attached to a rivet which is fastened to back plate 15. Spring 91 runs in tension to continuously urge pawl 81 in a clockwise direction (viewing FIG. 6), and thereby biases driving end 89 of the pawl toward ratchet wheel 93.

Turning now to an explanation of the operation of the intermittent drive mechanism 5 of sequence controller 1, it will be seen that when timing motor 3 is energized it drives pinion 9 thereof. Pinion 9 is in continuous mesh with gear 53 and thereby also drives the attached gear 55 (FIG. 3). Motor pinion 9 drives in a counterclockwise direction of rotation from its position as shown in FIG. 6. Gears 53 and 55 are thus driven in a clockwise direction of rotation. When indexing motor 4 is de-energized, gear 55 meshes with crank gear 57 and thus drives it in a counterclockwise direction of rotation. With locking lever 69 and pawl 81 in the pivotal or angular positions where they are shown in FIG. 6, the axis of eccentric portion 63 of the crank gear shaft 59 is disposed to the left of the axis of disc 65. With locking lever 69 and pawl 81 in these positions, locking end 79 engages between teeth 95a and 95b of ratchet wheel 93 above driving end 89 of the pawl (FIG. 6), and pawl end 89 engages notch 96b behind or underneath the tooth 95b of the ratchet wheel. Locking end 79 is then holding ratchet wheel 93 in position and the pawl is just beginning to drive.

As crank gear 57 rotates in a counterclockwise direction from the rotary position which it assumes in FIG. 6, eccentric portion 63 of crank gear shaft 59 moves to the angular position where it is shown in FIG. 7. Driving end 89 of pawl 81 thus drives tooth 95b of ratchet wheel 93 in a clockwise direction to the position where it is shown in FIG. 7. As tooth 95b is driven from its position in FIG. 6 to its position in FIG. 7, locking end 79 of the locking lever 69 rides out of the notch 96a between the ratchet wheel teeth 95a and 95b to where it is shown in FIG. 7.

As crank gear 57 then rotates in a further counterclockwise direction from its position in FIG. 7 to its position in FIG. 8, driving end 89 drives ratchet wheel tooth 95b to the angular location where it is shown in FIG. 8. Locking end 79 then enters the notch 96b which has been engaged by pawl end 89 (FIG. 8). When eccentric portion 63 is then rotated further in a counterclockwise direction from where it is shown in FIG. 8, back toward its position in FIG. 6, pawl driving end 89 moves out of its driving notch 96b and eventuates at notch 96c. Locking end 79 holds ratchet wheel 93 in the position where it is shown in FIG. 8, until driving end 89 begins to drive the ratchet wheel from notch 96c.

It will thus be seen by those skilled in the art that by by means of locking lever 69 and pawl 81 an efficient means has been provided for intermittently driving ratchet wheel 93 in response to continuous rotation of timing motor pinion 9. Pawl 81 has been driven in a sinusoidal fashion to rotate the ratchet wheel 93.

Turning now to an important aspect of my invention which provides a novel and improved means for rapidly advancing the switch operating members of my controller 1 to the desired starting position, attention is directed to FIGS. 1 and 3. When indexing motor 4 is energized, its pinion 10 is driven thereby in a counterclockwise direction of rotation (viewing FIG. 3). When motor 4 is de-energized, as shall be explained hereinafter, pinion 10 is freely rotatable upon its shaft. As previously mentioned, the output speed of indexing motor 10 is considerably greater than the output speed of timing motor pinion 9. For example, in accordance with the present invention, an indexing motor having an output speed in the order of 3,000 revolutions per minute has been used in conjunction with timing motors having an output speed ranging at approximately 1–8 revolutions per minute. Pinion 10 is in continuous mesh with crank gear 57, and when indexing motor 4 is energized, pinion 10 therefore drives crank gear 57 in the same direction of rotation as that direction in which it is driven by intermediate gear 55. If motors 3 and 4 were to both drive crank gear 57 at the same time, it will be understood by those skilled in the art that due to the difference in output speeds of these motors, detrimental effects would ensue. In particular, with both of the motors 3 and 4 driving crank gear 57 at the same time, the relatively high speed indexing motor 4 would overdrive timing motor 3 or have the output speed at pinion 10 slowed down thereby.

To overcome the possibility of the aforementioned detrimental effects and alternately drive the crank gear 57 in response to rotary motion of the pinion 10 of indexing motor 4 and pinion 9 of timing motor 3, as shown in FIGS. 1 and 3, the shaft 56 of gears 53 and 55 is journalled in diagonal slots 101a and 101b. Slots 101a and 101b are formed in support plate 49 and back plate 15, respectively. As viewed in FIG. 3, the slot 101a extends diagonally upwardly and to the left at an angle in the order of 45 degrees to the longitudinal centerline of support plate 49. As viewed in FIG. 1, the slot 101b extends upwardly and to the right at an angle in the order of 45 degrees to the longitudinal axis of back plate 15.

To expeditiously operate the switch operating members of controller 1, as previously explained, timing motor pinion 9 drives in a clockwise direction of rotation (viewing FIG. 3) and indexing motor pinion 10 drives in a counterclockwise direction of rotation (FIG. 3). When motor 4 is de-energized shaft 56 is driven to the bottom end 104 of slots 101a and 101b and pinion 9 drives gear 57 by the meshing engagement of gear 55 with gear 57. When indexing motor 4 is energized, its pinion 10 drives the crank gear 57 at a relatively rapid speed. The crank gear 57 then drives intermediate gear 55 instead of being driven thereby. With pinion 10 doing the driving, shaft 56 of gears 53 and 55 moves diagonally away from crank gear 57 toward upper end 103 of the slots 101a and 101b (viewing FIG. 3). When 56 moves diagonally in slots 101a and 101b away from bottom end 104 (FIG. 3), it is expeditiously disengaged from crank gear 57 and remains in driven engagement with timing motor pinion 3.

To simply and effectively operate the indexing motor 4 in controller 1 and thereby rapidly advance switch operating unit 6 to the desired starting position for its sequential operation, as shown in FIG. 2, pinion 10 of motor 4 is journalled between back plate 15 and support plate 49 by elongated shaft 105. Shaft 105 extends downwardly through plate 49, viewing FIG. 2, and has an annular clutch plate member 107 attached to an external portion thereof. The drive shaft 109 of motor 4 is coaxial to pinion shaft 105 and has clutch cup 111 attached to its knurled upper end (not shown). When clutch cup 111 is in the position where it is shown in full in FIG. 2, it is disengaged from clutch plate member 107 and motor 4 is de-energized. Pinion 10 then rotates freely on its shaft. Drive shaft 109 of motor 4 is arranged to move axially upwardly, viewing FIG. 2, upon energization of the motor 4. Thus, when motor 4 is energized, the clutch cup 111 moves upwardly to where it is shown by the dotted lines of FIG. 2, and frictionally engages clutch plate member 107. Indexing motor 4 then drives crank gear 57 in the manner previously described.

Clutch cup 111, as shown in FIG. 2 has an annular shoulder 113 formed at its upper end. Shoulder 113 engages a pair of external extensions 115 formed on arms of pivoted switch actuating lever 117. The lever 117, as shown in FIGS. 1 and 2, is arrow shaped and includes downwardly projecting extensions 115, a keyhole shaped slot 116 (FIG. 1) for clearance of cam shaft 105, pivot slot 118 and free end 121. When clutch cup 111 moves toward support plate 49, its annular shoulder 113 moves external extensions 115 of the pivoted switch actuating lever 117 upwardly (viewing FIG. 2) and pivots lever 117 in a clockwise direction of rotation about an upper boss of staked support 119. Free end 121 of lever 117 is thereby depressed against plunger 123 to operate switch 125. Switch 125 is a single pole double throw controlling device and when it is operated by the movement of the clutch cup 111, the pair of contacts closed thereby allow current to flow to the indexing motor through a manually operated switch and a series connected switch controlled by the main switch operating unit 6. A suitable circuit for such regulation of controller 1 is shown in FIG. 9 and shall be discussed hereinafter. The main switch operating unit 6 is then rapidly intermittently stepped to the predetermined angular starting position for a time cycle of operation. When the predetermined angular starting position has been reached by motor 4, certain cam operated switches open a circuit to the motor 4 and the timed cycle is driven by timing motor 3. The operation of such a circuit arrangement shall become apparent hereinafter.

Turning now to a discussion of the operation of the control devices of controller 1, as shown in FIG. 5, the main rotatable switch operating unit 6 comprises a series of cam members 197 which are stacked coaxially upon ratchet wheel 93. All of the cam members 197 are similar to each other and have the form shown in FIG. 2. More particularly, each of the cam members 197 is of one-piece molded construction and is characterized by a cylindrical bore 199 which extends generally perpendicularly between top and bottom ends 201 and 203 (FIG. 2). The bores 199 surround and receive cam shaft 105 after the various cam members have been stacked one upon the other and fastened together, as shall be described hereinafter. The particular construction of main switch operating unit 6, cam members 197 and the switch actuating followers associated therewith comprise the invention of Ernest W. Topping and Glenn R. Chafee, and this construction and arrangement are described in detail and claimed in the copending application Serial No. 83,463 of said Topping and Chafee filed concurrently herewith and assigned to the same assignee as the present invention.

As shown in FIG. 2, cam member 197 in general resembles a frusto-conically stepped wafer. Each cam member has three principal concentric and parallel cylindrical surfaces 207, 209 and 211. The diameter of cylindrical surface 207 is larger than the diameter of cylindrical surface 209, and the diameter of cylindrical surface 211 is smaller than that of cylindrical surface 209. The arrangement of cylindrical surfaces 207, 209 and 211 thus provides a cam member 197 which in general resembles a stack of integrated coaxially arranged discs having their outer peripheries progressively decreasing in radii between top end 201 and bottom end 203.

To fasten cam members 197 together with ratchet wheel 93 in a stacklike coaxial arrangement, each cam member 197 and the ratchet wheel 93 have a plurality of axially extending arc-shaped slots 215 formed therein in the same radial and angular disposition (FIG. 1). Cam members 197 are stacked uniformly one upon the other with the cylindrical surfaces 211 of smallest diameter for one cam member closely adjacent to cylindrical surfaces 207 of the largest diameter for an axially adjacent cam member (as shown in FIG. 2). To properly orient the cam members 197 and ratchet wheel 93 axially with respect to each other before fastening them together, locating notches 217 (FIG. 5) have been formed in cylindrical surfaces 207 of the cam members 197. The locating notches of cylindrical surfaces 207 are registered with a specific tooth on the ratchet wheel 93. The cylindrical bores 199 of cam members 197 are then in axial alignment with a bore (not shown) of ratchet wheel 93, and the arc-shaped slots 215 are also in axial alignment. The ratchet wheel and the cam members are then locked together by injecting a fusible material such as thermoplastic or a low melting point metal alloy into the slots 215.

It will thus be seen that cylindrical surfaces 207, 209 and 211 of each cam member 197 are progressively and concentrically stepped along the axis of the cam member and that these cam members are fastened to ratchet wheel 93 to form the main switch operating unit 6. To enable the cylindrical surfaces 209 and 211 to each operate one of the cam followers 219 and 220, each of these cylindrical surfaces has at least one radial discontinuity formed therein. These discontinuities are represented as peripheral interruptions 221 in FIG. 5.

Figure 4:
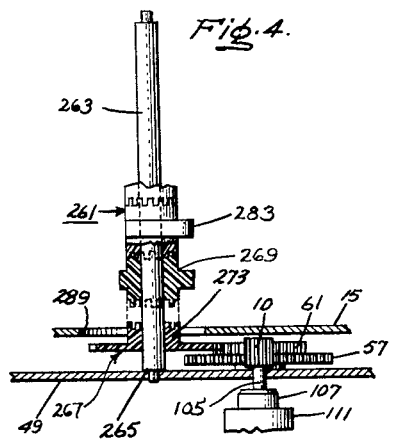
FIG. 4 is a fragmentary elevation view partially in section and partially exploded to illustrate the auxiliary cam gear and associated auxiliary cams.

To provide a means for efficiently actuating the switching devices of the sequence controller 1 within a relatively small spacial area of the controller housing, two oppositely disposed groups of the pivoted followers 219 and 220 are utilized. One of these groups is disposed about an axis parallel to cam shaft 105 on each side of the main switch operating unit 6. More particularly, shafts 223 are each suitably positioned through apertures 225 of front plate 13 and back plate 15 (FIG. 5) and are held therein by engagement with a C-shaped clip 226 and shoulder 227 formed at the bottom end of the shaft (FIG. 2). Shoulder 227 engages the inner side of support plate 49, as shown in FIG. 4. C-shaped clip 226 engages the surface of the back plate 15 facing support plate 49.

As best shown in FIG. 5, the followers 219 and 220 resemble each other in over-all appearance, but they are slightly different from each other structurally. The reason for this structural dissimilarity in the followers shall become apparent hereinafter. More particularly, followers 219 each have a stepped hub portion 229 with a bearing aperture therein (FIG. 5). Hub portion 229 is relatively thin in depth and generally coplanar with a radially spaced cam engaging point 231. Point 231 of each of the followers 219 has a relatively thin configuration to enable it to engage a cylindrical surface 211 of cam member 197 and ride thereupon. On the other side of each of the followers 219, a switch actuating point 233 is formed (FIG. 5). Actuating point 233 is thus angularly spaced from cam engaging point 231 and it is also disposed at a greater radial dimension from the aperture of hub portion 229. Switch actuating points 233 are considerably thicker than cam engaging points points 231, and extend in a direction generally opposite to that of the cam engaging point 231.

Followers 220 are similar to the followers 219 in that they also provide stepped hub portions 235. But cam engaging points 237 of followers 220 (FIG. 5) are each of the same thickness as switch actuating points 233 of followers 219. In addition, switch actuating points 239 are provided on each of the followers 220. Points 239 have the same depth and are of the same configuration as points 233 of followers 219.

Turning now to a consideration of the arrangement of the cam followers 219 and 220, as shown in FIGS. 2 and 5, they are stacked in alternate angularly separated disposition with shaft 223 extending through apertures formed in the hub portions 229 and 235. More particularly, on each side of the operating unit 6, there is a series of pairs of axially adjacent followers 219 and 220 which are angularly spaced with respect to each other. As shown in FIG. 2, it will be seen that hub portions 229 and 235 for each pair of axially adjacent followers 219 and 220 cooperate via the stepped configurations thereof so that each follower 219 is substantially coplanar to its associated axially adjacent follower 220. The relatively thick cam engaging point 237 of follower 220 engages cylindrical surface 209 (FIG. 2) of an associated cam member 197 and is actuated thereby, and the relatively thin cam engaging point 231 of axially adjacent and angularly spaced follower 219, engages an associated cylindrical surface 211 of the same cam member and is actuated thereby.

Followers 219 and 220 are pivotally arranged on each of the shafts 223 in essentially the same manner, with axially adjacent cam followers 219 and 220 on one of the shafts 223 (FIG. 2) being controlled by the cylindrical surfaces 211 and 209 respectively of one of the cam members 197 and another pair of axially adjacent followers 219 and 220 being diametrically disposed on the other side of the cam stack and controlled by the appropriate cylindrical surfaces of the next cam member, etc. This arrangement of the followers enhances the smallness in size of the controller 1 for providing a multiplicity of controlling functions.

To operate a multiplicity of electric switches in response to pivotal movements of followers 219 and 220, as illustrated in FIGS. 1 and 5, each of the terminal boards 17 and 18 provides a group of single pole single throw switches 240. More particularly, fixed contact terminals 241 are arranged linearly in rows and in parallel fashion near each end of terminal boards 17 and 18. Each of the fixed contact terminals 241 is extended through a suitable aperture and staked uniformly to the terminal board, as shown in FIGS. 2 and 5, with a fixed contact 243 and supporting blade portion 244 integral to the inner side thereof. The supporting blade portions for the fixed contacts 243 are thus arranged in coplanar fashion on each side of the terminal board with the fixed contacts 243 facing into molded terminal board recesses 245 (FIG. 1). Disposed between each of the rows of contact terminals 241 are two adjacent parallel rows which each include movable contact terminals 247. Terminals 247 are uniformly arranged in the same manner as fixed contact terminals 241 and each of these terminals is staked to the associated terminal board with a movable contact blade 249 and associated movable contact 251 also being staked thereto. Movable contact blades 249 are arranged uniformly in cantilever fashion with each blade normally biasing its movable contact 251 into engagement with an associated fixed contact 243. A suitable means (not shown) is provided for normally biasing movable contact blades 249 toward the contacts closed position for each switch 240.

Each of the terminal boards 17 and 18 is positioned on one side of the controller 1, as shown in FIG. 1, with its fixed and movable contact terminals 241 and 247 perpendicularly overlying the planes of the flanged sides 43 of back plate 15. The boards 17 and 18 are thus oppositely disposed and in parallel relationship. Each board has thereon two rows of normally closed switches arranged next to each other, and thereby provides a plurality of substantially coplanar switching devices 240. The terminal boards 17 and 18 are also interchangeable and may be used on either side of the switch. It will be understood by those skilled in the art that other terminal boards similar to terminal boards 17 and 18 may also be expeditiously and suitably arranged at each end of the controller housing (such as, for example, where spacer plates 21 and 23 have been shown fragmentarily in FIG. 5), to provide a controller with an even greater circuit controlling capability.

With the terminal boards 17 and 18 positioned in controller 1, one of the groups of stacked and angularly adjacent followers 219 and 220 is located adjacent to and inwardly of each terminal board (FIG. 1). The cam engaging points 237 of followers 220 of one group (e.g., the group next to board 17) ride upon cylindrical surfaces 209 of alternate cam members 197 and the cam engaging points 231 of followers 219 of that same coaxially arranged group of followers are angularly spaced from the points 237 thereof and ride upon cylindrical surfaces 211 of the same associated alternate cam members 197 as points 237 of that group. As previously mentioned, each axially adjacent pair of followers 219 and 220 is substantially coplanar, and these followers are controlled by the cylindrical surfaces 209 and 211 of one associated cam member 197.

The cam engaging points 237 and 231 of followers 220 and 219 on the other group (e.g., the group next to board 18) are arranged in the same manner as described for terminal board 17. Each axially adjacent pair of followers 219 and 220 of this second group is controlled by the cylindrical surfaces 209 and 211 of one associated cam member 197 that is consecutive to a cam member 197 controlled by the first described group (see FIG. 2).

Turning now to a discussion of the operation of the switches of controller 1 by cam followers 219 and 220, attention is directed to FIG. 1. The followers 219 and 220 are pivotally arranged upon their bearing shafts 223 so that the cam engaging points 231 and 237 ride upon cylindrical surfaces 211 and 209 between the annular shoulders provided by surfaces 207 of axially adjacent cam members 197. The shoulders underneath surfaces 207 thus provide integral trapping rings for axially segregating and positioning each of the cam followers upon its bearing shaft 223.

With each pair of axially adjacent followers 219 and 220 positioned alongside of the cam member 197 which is to control it (as shown in FIGS. 1 and 2), switch actuating points 233 and 239 are in engagement with associated movable contact blades 249 (FIG. 1). The biasing force provided for each blade 249 is therefore exerted upon points 233 and 239 of the followers to bias them radially (about their axes) toward the axis of the cam members 197. When the cam engaging point (e.g., point 237 of follower 220 in FIG. 1) is at its radially innermost position with respect to its associated cylindrical surface or cam track 209, it is held there by the biasing force of the movable contact blade which it engages. As the associated cam member 197 is then rotated intermittently by the previously described drive mechanism, when the cam engaging point reaches the radially outermost position of its cylindrical surface or cam track, it is cammed radially outwardly (relative to cam member 197) to overcome the biasing force of its movable contact blade and it opens the associated switch.

Turning now to a further and important aspect of the present invention, to provide an efficient and simplified means for enhancing the control flexibility for the followers of sequence controller 1, as shown in FIGS. 1 and 2, an auxiliary cam stack 261 has been utilized. The cam stack 261 is illustrated in perspective in FIGS. 5 and 5a and it includes shaft 263, with an annular shoulder 265 formed at each of its ends (FIG. 5), auxiliary cam gear 267, and six identical auxiliary or sub-interval cams 269. Gear 267 has a hub portion 273 integral thereto and may be of one-piece die-cast metal construction. Hub portion 273 is concentric to gear 267 and is attached to shaft 263 by means of knurls formed thereon (not shown) which engage an aperture of hub portion 273. Hub portion 273 has a generally cylindrical configuration, and extends perpendicularly outwardly and upwardly (viewing FIG. 2) from the inner surface of cam gear 267. At the axially outermost end of hub portion 273, a series of box-shaped projections 275 are molded thereto. Projections 275 extend both axially and radially and are spaced transversely from the axis of hub portion 273 by an annular recess, such as recess 277 of cam 269. Between each pair of the projections 275, there is a radially and axially extending groove 279. It will thus be seen that the radially extending projections 275 and grooves 279 resemble in appearance an annular castle-like structure.

Turning now to the structure of auxiliary cams 269, as shown in FIGS. 5 and 5a, each of these cams has an annular hub portion 281 which extends perpendicularly outwardly from each side of a radial cam portion 283. On each axially outermost end of hub portion 281, a series of box-shaped projections 275 and grooves 279 are formed thereon in the same configuration as for cam gear hub 273. The projections 275 and grooves 279 also extend axially and radially in the same manner as those of cam gear hub portion 273 and they are of the same size.

After auxiliary cam gear 267 has been fastened to shaft 263 in the axial position suggested in FIG. 2, a first auxiliary cam 269 is coaxially arranged upon shaft 263, rotated to the desired predetermined camming position, and then interfitted or interdigitated by axial movement into engagement with hub portion 273. Hub 281 of cam 269 includes a central aperture which is larger in diameter than shaft 263, and cam 269 is therefore free to rotate about shaft 263 until such time as the hubs 273 and 281 are interdigitated. To explain this procedure in greater detail, after a predetermined axial relationship between auxliary cam gear 267 and auxiliary cam 269 is first obtained by rotating one with respect to the other, the castle-like combination of projections 275 and grooves 279 of the cam gear hub portion 273 cooperate with the identically configured projections 275 and grooves 279 on cam hub portion 281 to angularly interlock the auxiliary cam gear 267 to the first auxiliary cam 269 (FIG. 5a).

In the illustrated controller, after the first auxiliary cam 269 has been angularly interlocked with auxiliary cam gear 267 in the manner described, five other auxiliary cams 269 are interlocked with the first one and with each other by the same procedure (see FIG. 2).

To restrain auxiliary cams 269 from axial movement on shaft 263 after they have been interlocked, clamping sleeve 285 is fastened to one end of the shaft 263, as shown in FIG. 5.

It will thus be seen that auxiliary cam stack 261 includes an axially spaced integrated combination of concentrically disposed gear 267 and six radial cam portions 283, which is readily assembled and may be expeditiously adjusted. When cam stack 261 has been assembled and adjusted, shaft 263 is positioned within apertures of front plate 13 and support plate 49, with shoulders 265 engaging the inner surfaces of the plates (FIG. 2).

As shown in FIG. 1, the cam portions 283 are axially positioned adjacent to and are engageable with an inwardly extending shoulder 287 of an associated cam follower 219. Back plate 15 has an enlarged aperture 289 (FIG. 3) through which hub portion 273 of auxiliary cam gear 267 is extended. Gear 267 thus lies between back plate 15 and support plate 49, as shown in FIG. 2. Gear 267 is also in mesh with and continuously driven by auxiliary gear 61 whenever motor 3 is energized (FIG. 3). It will thus be seen that all of the cam portions are driven by gear 61, due to their integral attachment to auxiliary cam gear 267.

To describe the operation of cam stack 261, attention is directed to FIG. 1. When the radially innermost surface 291 of cam portion 283 is adjacent shoulder 287 of follower 219, it has no effect thereupon and is disengaged therefrom. However, in response to time driven rotation of gear 267 in a clockwise direction (viewing FIG. 1), when the radially outermost surface 293 of cam portion 283 is reached, follower 219 is engaged by the cam portion 293, and the associated movable contact blade is cammed to its contacts open position, as shown in FIG. 1.

In the illustrated controller, by means of my invention, one of the switches 240 controlled by a cam 269 is axially adjusted on the stack 261 so that it may serve as an interlocking means until the backstroke of pawl 81 is reached. This beneficial function of one of the cams 269 shall be further described hereinafter.

It will be understood by those skilled in the art that other auxiliary cam stacks with any desired number of interdigitated cams and such as the illustrated cam stack 261 may also be used to provide time driven controlling functions for various other followers of controller 1, thereby enhancing the flexibility of control thereof.

To provide a means for manually rotating the main cam stack 6, the aforementioned cam shaft 105 has been provided. Shaft 105 is rotatably journalled through aperture 294 of front plate 13 (FIG. 5). Bushing 295 is attached to the ratchet wheel 93 and is also fitted into and attached to bearing bushing 297. Bearing bushing 297 is rotatably mounted in a suitable aperture of the back plate 15 by C-shaped clip 299 (not shown). It will be understood by those skilled in the art that bushings 295 and 297 could be combined into a single bushing member attached to unit 6 or could also be made an integral part of ratchet wheel 93, with equivalent functional advantage being afforded thereby. Near bottom end 301 of shaft 105, keyway slot 303 (FIG. 5) is formed in the periphery of shaft 105. Slot 303 has a key 305 attached thereto, as is well known in the art, to enable shaft 105 to lock with a mating D-shaped aperture 307 formed in bushing 295. Key 305 of shaft 105 is aligned with and received within aperture 307 of bushing 295 so that ratchet wheel 93 and cam members 197 are locked to and rotatable with shaft 105.

FIG. 9 illustrates a typical control circuit with which the sequence controller 1 of my invention may be expeditiously utilized. Power is supplied to the circuit at terminals 310 and 311. Indexing motor 4 is connected at one side thereof to terminal 311 by terminal 312 and at the other side thereof to terminal 309. Terminal 309 connects indexing motor 4 in series with a parallel combination of normally open manually controlled switches 313, 314, and 315. The manually controlled switches 313, 314, and 315 are each in series with one of the normally closed cam operated switches 140a, 140b, and 140c respectively. The other side of the parallel combination of switches 313, 314, and 315 and their associated series connected switches 140a, 140b, and 140c, is connected to the other side of the power supply (and terminal 310) by a lead connected between terminal 316, and terminal 317 of the single pole double throw switch 125. A normally open momentary switch 318 is also connected across terminals 319 and 320 in series with motor 4 and the parallel combination of switches 313, 314 and 315. Switch 318 is closed momentarily in conjunction with the selective closure of any one of the manually operated switches 313, 314, and 315, to momentarily energize indexing motor 4. The other terminal 322 of the single pole double throw switch 125 is connected in series with a normally closed cam operated switch 140d. Contact 324 of switch 140d is connected to contact 326 of the timing motor 3. The other contact 328 of motor 3 is connected to the other side of the line at terminal 312. Terminals 326 and 328 are connected to timing motor terminals 330 and 332 respectively, which are in turn connected to the apparatus which is to be controlled in a timed sequence.

As shown in FIG. 9, it should also be noted that a special cam operated switch 140e has been provided in the parallel combination of switches 313, 314, and 315, etc. Switch 140e is controlled by one of the sub-interval or auxiliary cams 283 and is connected in parallel with the series connected switches 313, 140a; 314, 140b; and 315, 140c; to serve as an interlocking means until the back stroke of pawl 81 is reached.

Turning now to a description of the operation of the circuit shown in FIG. 9, a particular cycle or part of a master cycle is selected by actuating one of the manually operated normally open switches 313, 314, or 315 to its closed position. Before closing one of the switches 313, 314 or 315, the movable contact of switch 125 is normally engaged with terminal 322. Cam operated switch 140d is open at the end of any cycle. It will be understood, therefore, that indexing motor 4 and timing motor 3 are de-energized. As an example, it is supposed that switches 313, 314, and 315 are part of a multiple push-button switch and switch 313 thereof is depressed to provide the desired sequence variation of the master cycle. When switch 313 is closed, the normally open interlock switch 318 is closed momentarily. This energizes the high speed motor 4 by current flow from terminal 312 to terminal 319 through motor 4, and switches 313, 140a and 318. Axial movement of shaft 109 of indexing motor 4 (viewing FIG. 2) then moves the free end 121 of lever 117 downwardly against its pivot to depress plunger 123 of switch 125. With plunger 123 of switch 125 depressed, the movable contact of switch 125 then moves into engagement with terminal 317. When momentary switch 318 re-opens, current then flows to the indexing motor through switches 313, and 140a, terminal 318, and switch 125. Motor 4 then rapidly drives the main switch operating unit 6 and the auxiliary cam unit 261 to the predetermined position selected by the switch 313. More particularly, motor 4 then drives until after the cam operated switch 140a opens the circuit to manual switch 313. The interlocking switch 140e then holds in motor 4 until the back stroke of pawl 81 is reached. Cam 183 thereupon opens the circuit to motor 4. The de-energization of motor 4 moves the movable contact of switch 125 back into engagement with terminal 322. When this occurs, the timing motor 3 then drives the switch operating units 6 and 261 in a timed sequence until such time as it is de-energized by cam operated switch 140d.

It will now, therefore, be seen that the improved sequence controller of the present invention includes a novel and improved mechanism for efficiently operating a plurality of switching devices in a predetermined sequence by intermittent rotary motion. It will further be seen that the sequence controller described herewith includes a simplified and novel structure for rapidly driving a plurality of switch operating members to preselected starting positions. It will further be seen that the controller of my invention is very flexible in its operational capabilities.

While, in accordance with the patent statutes, I have described what at present is considered to be the preferred embodiment of my invention, it will be obvious to those skilled in the art that various changes and modifications may be made therein without departing from the invention, and I, therefore, aim in the following claims to cover all such equivalent variations as fall within the true spirit and scope of the invention.

What I claim as new and desire to secure by Letters Patent of the United States is:

1. Control mechanism for operating a plurality of control devices, comprising a main rotatable operating unit, a plurality of actuating means distributed about the axis of said main operating unit and actuated thereby to control said devices in sequence and complete a cycle of operation, a driven means for rotating said main operating unit, a gear means separate from said main operating unit and in driving relation to said driven means, at least one auxiliary operating unit stacked axially upon said gear means, and complementary interdigitating means for securing said auxiliary operating unit to said gear means, said auxiliary operating unit being engageable with an associated one of said actuating means thereby to provide a controlling means for at least one of said devices.

2. Control mechanism for operating a plurality of control devices, comprising a main rotatable cam unit, a plurality of followers distributed about the axis of said main cam unit and operated thereby to actuate said devices in sequence and complete a cycle of operation, a driven gear means for rotating said main unit, additional gear means in driving relationship with said driven gear means, at least one auxiliary cam stacked axially upon said additional gear means, and complementary interdigitating means for securing said auxiliary cam to said additional gear means, said auxiliary cam being engageable with an associated one of said followers thereby to provide an additional controlling means for at least one of said devices.

3. Control mechanism for operating a plurality of control devices, comprising a main rotatable cam unit, a plurality of followers distributed about the axis of said main cam unit and operated thereby to actuate said devices in sequence and complete a cycle of operation, a driven means for rotating said main unit, additional driven means in driving relationship with said driven means, at least one auxiliary cam stacked coaxially upon said additional driven means, and complementary interdigitating means for securing said auxiliary cam to said additional driven means, said interdigitating means including a plurality of axially and radially extending complementary teeth formed on one end of said cam and on a mating end of said additional driven means, said auxiliary cam being engageable with an associated one of said followers thereby to provide an additional controlling means for at least one of said devices.

4. Control mechanism for operating a plurality of control devices, comprising a main rotatable cam unit, a plurality of followers distributed about the axis of said main cam unit and operated thereby to actuate said devices in sequence and complete a cycle of operation, a motor driven means for rotating said main unit a timed sequence, an indexing driven means for rotating said main unit to a predetermined starting position for commencement of a timed operation, additional driven means alternatively driven by said motor driven means and said indexing driven means, and at least one auxiliary cam stacked axially upon said additional driven means, and complementary interdigitating means for securing said auxiliary cam to said additional driven means, said auxiliary cam being engageable with an associated one of said followers thereby to provide an additional controlling means for at least one of said devices.

5. Control mechanism for operating a plurality of control devices, comprising a main cylindrical rotatable cam unit, a plurality of followers distributed about the axis of said main cam unit and actuated thereby to control said devices in sequence and complete a cycle of operation, a motor driven means for rotating said main cam unit in a timed sequence, indexing driven means for rapidly rotating said main unit to a predetermined starting position for a timed operation, additional driven means including s gear means alternatively driven by said motor driven means and said indexing driven means, a plurality of auxiliary cams stacked coaxially upon said gear means, and complementary interdigitating means for securing said auxiliary cams to each other and to said gear means, said interdigitating means including a plurality of axially and radially extending complementary teeth formed on one end of said gear means and on each end of said cam, the teeth of said cam and said gear means cooperating to lock them together coaxially in predetermined angular disposition, said auxiliary cams being engageable with associated ones of said followers thereby to provide a controlling means for a plurality of said devices.

6. Control mechanism for operating a plurality of control devices, comprising a main rotatable operating unit, a plurality of followers distributed about the axis of said unit and operated thereby to actuate said devices in sequence and complete a cycle of operation, gear means acting upon said operating unit for impelling said unit, indexing driven means connected to said gear means for intermittently rotating said unit rapidly in successive steps, motor driven timing means connected to said gear means intermittently rotating said operating unit in successive steps, said timing means including a timing output gear and an intermediate gear located between said timing output gear and said gear means, said intermediate gear being continuously driven by said output gear means and arranged to act upon said gear means thereby to rotate said unit, said intermediate gear being rotatably journalled in an elongated supporting slot, the positioning of said slot and said intermediate gear being such that the intermediate gear is driven toward one end of the slot by the output gear means when said indexing driven means is de-energized thereby to rotate said unit, said intermediate gear being movable toward the other end of said slot when said indexing driven means is energized, thereby to disengage said intermediate gear from driving relationship with said gear means and said operating unit and allow said unit to be driven by the indexing driven means, an auxiliary gear in alternative driven engagement with said indexing driven means and said motor driven timing means, at least one auxiliary operating unit including a cam stacked coaxially upon said auxiliary gear, and complementary interdigitating means for securing said cam to said auxiliary gear, said auxiliary cam being engageable with an associated one of said followers thereby to provide a controlling means for at least one of said devices.

7. Control mechanism for operating a plurality of control devices, comprising a rotatable operating unit, follower means distributed about the axis of said unit and operated thereby to actuate said devices in sequence and complete a cycle of operation, gear means acting upon said operating unit for impelling said unit, indexing motor means connected to said gear means for intermittently rotating said unit rapidly in successive steps, timing motor means connected to said gear means for intermittently rotating said operating unit in successive steps, said timing motor means including a timing output gear and an intermediate gear located between said timing output gear and said gear means, said intermediate gear being continuously driven by said output gear and arranged to act upon said gear means thereby to rotate said unit, said intermediate gear being rotatably journalled in a elongated supporting slot, the position of said slot and said intermediate gear being such that the intermediate gear is driven toward one end of the slot by the output gear when said indexing motor means is de-energized thereby to rotate said unit, said intermediate gear being movable toward the other end of said slot when said indexing motor is energized, thereby to disengage said intermediate gear from driving relationship with said gear means and allow said unit to be driven by the indexing motor means.

8. Control mechanism for operating a plurality of control devices, comprising a rotatable operating unit, follower means distributed about the axis of said unit and operated thereby to actuate said devices in sequence and complete a cycle of operation, gear means acting upon said operating unit for impelling said unit, indexing motor means connected to said gear means for intermittently rotating said unit rapidly in successive steps, timing motor means connected to said gear means for intermittently rotating said operating unit in successive steps, said timing motor means including a timing output gear and an intermediate gear located between said timing output gear and said gear means, said intermediate gear being continuously driven in a predetermined direction of rotation by said output gear and arranged to act upon said gear means thereby to rotate said unit, said intermediate gear being rotatably journalled in an elongated supporting slot, the positioning of said slot and said intermediate gear being such that the intermediate gear is driven toward one end of the slot by the output gear when said indexing motor means is de-energized thereby to rotate said unit, said intermediate gear being movable toward the other end of said slot when said indexing motor is energized thereby to disengage said intermediate gear from driving relationship with said gear means and allow said unit to be driven by the indexing motor means, said indexing motor means being arranged to drive said intermediate gear in the same direction of rotation as the direction in which it is driven by the output gear.

9. The control mechanism of claim 8 wherein the indexing motor means includes a drive shaft that reciprocates axially upon energization of said motor, a switching means for controlling an electrical circuit to said motor, and a pivoted lever for transmitting reciprocating motion from said drive shaft to said switching means thereby to control said motor.

10. Control mechanism for operating a plurality of control devices, comprising a main rotatable operating unit, an auxiliary rotatable operating unit disposed in disassociated relationship to said main unit, a motor driven means for rotating said main unit and said auxiliary unit at different speeds of rotation, the speed of rotation of said auxiliary unit being substantially greater than the speed of rotation of said main unit, a plurality of followers operable by and engageable with said main unit, said auxiliary unit including at least one cam portion engageable with one of said followers, said one follower being adjacent to said main and said auxiliary units and arranged for coaction with both of said units to operate one of the control devices at predetermined angular dispositions of said units.

11. Control mechanism for operating a plurality of control devices, comprising a main rotatable cam unit disposed in disassociated relationship to said main unit, an auxiliary rotatable cam unit, a motor driven means in intermittent driving relationship with said main cam unit and in continuous driving relationship with said auxiliary cam unit for rotating said units at different speeds of rotation, the speed of rotation of said auxiliary unit being substantially greater than the speed of rotation of said main unit, a plurality of followers operable by and engageable with said main unit, said auxiliary unit including at least one auxiliary cam portion engageable with one of said followers, said one follower being adjacent to said main and auxiliary units and arranged for coaction with both of said units to operate one of the control devices at predetermined angular dispositions of said units.

12. The control mechanism of claim 11 wherein the main cam unit is intermittently driven by a motor driven pawl and ratchet wheel, said pawl bein movable sinusoidally to intermittently step the ratchet wheel about its axis, said ratchet wheel being coaxially attached to said main unit to transmit the intermittent driving strokes of the pawl to said main unit, the cam portion of said auxiliary unit being arranged to actuate said one follower each time that the pawl reaches its backstroke thereby to operate the associated control device.

13. Control mechanism for operating a plurality of electric switches comprising a main rotatable operating unit, an intermittent driving member for stepping said main unit in a timed sequence, a motor driven means for driving said intermittent driving member, an indexing means for rapidly advancing said main operating unit to a desired starting position, a control circuit for said indexing means including a normally closed switch in series with said indexing means, and an auxiliary rotatable operating unit continuously driven alternatively by said motor driven means and said indexing means, said auxiliary unit including a cam section arranged to actuate said switch cyclically to its open position each time the intermittent driving member has completed its driving stroke and is on its backstroke, thereby to maintain a current path to said indexing means until the intermittent member reaches the backstroke thereof.

14. Control mechanism for operating a plurality of control devices, comprising a rotatable operating unit, follower means distributed about the axis of said unit and operated thereby to actuate said devices in sequence, a first gear means, first and second motor means arranged to operate said first gear means for alternatively rotating said unit at first and second different speeds of rotation, and a second gear means continuously driven by said first motor means and interconnectable between said first motor means and said first gear means to drive said unit, said second gear means being rotatably journalled in an elongated supporting slot, the positioning of said slot and said second gear means being such that the second gear means is driven toward one end of the slot by the first motor means when the second motor means is de-energized, said first motor means thereupon driving said operating unit through said first and second gear means, said second gear means being arranged in said slot for movement toward the other end of said slot when the second motor means is energized thereby to disengage the second gear means from driving connection to said operating unit and allow said second motor means to drive said operating unit.

References Cited in the file of this patent
UNITED STATES PATENTS

| | | |
|---|---|---|
| 628,042 | Schultze | July 4, 1899 |
| 1,021,016 | Thomas | Mar. 28, 1912 |
| 1,512,034 | Luitwieler | Oct. 21, 1924 |
| 2,344,253 | Kirby | Mar. 14, 1944 |
| 2,345,778 | Van Lammeren et al. | Apr. 4, 1944 |
| 2,381,545 | Kirby | Aug. 7, 1945 |
| 2,468,974 | Hammer | May 3, 1949 |
| 2,594,911 | Goff | Apr. 29, 1952 |
| 2,642,503 | Dietrich | June 16, 1953 |
| 2,656,424 | Frerer et al. | Oct. 20, 1953 |
| 2,788,850 | Leunberger | Apr. 16, 1957 |
| 2,796,474 | Glogau | June 18, 1957 |
| 2,817,724 | Skidgel | Dec. 24, 1957 |
| 2,854,855 | Dudley | Oct. 7, 1958 |
| 2,912,527 | Naimer | Nov. 10, 1959 |
| 2,917,591 | Juhas | Dec. 15, 1959 |
| 2,932,983 | Laviana et al. | Apr. 19, 1960 |
| 3,035,129 | Glass | May 15, 1962 |